United States Patent
Osawa et al.

(10) Patent No.: US 7,199,087 B2
(45) Date of Patent: *Apr. 3, 2007

(54) METHOD TO REFINE LUBRICANT FOR A MAGNETIC RECORDING MEDIUM

(75) Inventors: Yoshihito Osawa, Nagano (JP); Shinji Shirai, Nagano (JP); Masayuki Ishkawa, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 426 days.

This patent is subject to a terminal disclaimer.

(21) Appl. No.: 10/620,773

(22) Filed: Jul. 17, 2003

(65) Prior Publication Data

US 2004/0092406 A1    May 13, 2004

(30) Foreign Application Priority Data

Jul. 17, 2002   (JP)   ............... 2002-208873

(51) Int. Cl.
    *C10M 15/54*    (2006.01)
    *C10M 175/00*   (2006.01)
    *G11B 5/725*    (2006.01)

(52) U.S. Cl. ............... 508/111; 508/582; 428/825.1; 428/835.8

(58) Field of Classification Search ............... 508/111; 428/800–840
    See application file for complete search history.

(56) References Cited

U.S. PATENT DOCUMENTS 6,099,937 A    8/2000   Gui et al.
6,911,420 B2 *  6/2005  Osawa et al. ............... 508/111
2003/0100454 A1  5/2003  Osawa et al.

FOREIGN PATENT DOCUMENTS

| JP | 05-020673  | 1/1993 |
| JP | 05-049806  | 3/1993 |
| JP | 11-199882  | 7/1999 |
| JP | 2001-164279 | 6/2001 |
| JP | 2001-229524 | 8/2001 |

OTHER PUBLICATIONS

Machine Translation of JP 2001-164279, Kato Kazuaki, publication date Jun. 19, 2001.*

"Fomblin Z Derivatives" Product Data Sheet by Solvay Solexis, Inc, Dec. 13, 2002.*

* cited by examiner

Primary Examiner—Joseph D. Anthony

(57) ABSTRACT

A method refines a lubricant comprising a compound having a perfluoropolyether structure via supercritical extraction. A lubricant is refined using the method and a magnetic recording medium that utilizes the refined lubricant. The refined lubricant exhibits excellent lubrication performance and long term stability in the magnetic recording medium. In one embodiment of the supercritical extraction, the lubricant contacts an extracting medium of supercritical carbon dioxide under a predetermined condition in a pressure vessel to remove ionic impurities and perfluoropolyether compounds having a weak polarity terminal group contained in the lubricant.

9 Claims, 2 Drawing Sheets

METHOD TO REFINE LUBRICANT FOR A MAGNETIC RECORDING MEDIUM

CROSS-REFERENCE TO RELATED APPLICATION

This application is based on, and claims priority to, Japanese Application No. 2002-208873, filed Jul. 17, 2002, the contents of which are incorporated by reference herein.

BACKGROUND OF THE INVENTION

1. Field of the Invention

The present invention is directed to a method to refine lubricant for a magnetic recording medium, a lubricant refined by the method, and a magnetic recording medium using the lubricant.

2. Description of the Related Art

Recording media such as fixed magnetic recording media are used as general-purpose data recording media in computers. A magnetic recording apparatus containing fixed magnetic recording media comprises a driving mechanism for the magnetic recording media, a driving mechanism for a magnetic head, a stopping mechanism for the magnetic head, and a data transfer mechanism, as well as one or more magnetic recording media. In recent years, the magnetic recording media have shown significant progress in increasing recording density, capacity, and data transfer rate.

A conventional fixed magnetic recording apparatus employs the contact start and stop (CSS) system, in which a magnetic recording head floats while the magnetic recording medium is rotating, and the magnetic head comes in contact with the surface of the magnetic recording medium when the motor for driving rotation of the magnetic recording medium stops. In this system, the magnetic head slides on the surface of the magnetic recording medium at the time of start and stop of rotation of the magnetic recording medium, and friction occurs between the magnetic recording medium and the magnetic head. To protect the magnetic layer from friction, a protective layer is provided, and a lubricant layer is provided to improve lubricity on the surface.

Recently, a rotating speed of a magnetic recording medium of a magnetic recording apparatus has increased from a traditional 5,400 rpm to a speed in a range of 7,200 to 15,000 rpm. As a result, a spin migration or spin off phenomenon, in which lubricant on the surface of a magnetic recording medium moves to a peripheral region or scatters from the medium surface, has become significant. Furthermore, the heat generated at high rotating speed evaporates the lubricant and introduces a problem of loss of the lubricant mass.

The thickness growth of the lubricant layer in the peripheral region of the magnetic recording medium induced by the spin migration causes adhesion obstruction. The evaporation of the lubricant may cause the protective layer to wear because of the decrease of the lubricant layer thickness. In the worst case, head crash occurs.

A lubricant layer of a magnetic recording medium needs to be in a stable form in a uniform thickness on a protective layer surface to avoid spin migration. In addition, strong adhesion and bonding are required at the interface between the lubricant layer and the protective layer. To enhance the adhesiveness, a perfluoropolyether lubricant having a terminal group of a hydroxy group or a piperonyl group is used. Such types of lubricant are available, for example, from Ausimont KK under the trade names of Fomblin Z DOL, Fomblin Z tetraol, and AM3001. Most of the presently used perfluoropolyether lubricant is prone to exhibit poor heat resistance in a very low molecular weight range, and high statical friction in a very high molecular weight range. Consequently, the lubricant now used has a number average molecular weight (Mn) in a range of 1,000 to 10,000, more specifically, a range of 2,000 to 4,000.

The above-described kinds of lubricant perform well in the range of the present rotating speed of a magnetic recording medium. However, at a higher rotating speed, a problem with durability against a phenomenon like spin migration may exist.

Japanese Unexamined Patent Application Publication No. 2001-229524 discloses the use of a lubricant that has a high molecular weight and a narrow distribution of molecular weight. Such a lubricant eliminated the problem accompanied by a conventional lubricant having a high molecular weight and increased adhesiveness with a protective layer, improving durability against spin migration.

While a lubricant having a high molecular weight was used in the Japanese Unexamined Patent Application Publication No. 2001-229524, a minimized flying height of a magnetic head raises a problem due to an effect of the lubricant molecules. Namely, the size of the lubricant molecules has an effect on the flight of the magnetic head, where there is a minimized distance between the magnetic head and the magnetic recording medium. Accordingly, if the durability against spin migration is similar, a lubricant with a lower molecular weight is preferable, as long as heat resistance is secured.

As described above, a lubricant needs improvement in view of the molecular weight, durability against spin migration, and heat resistance.

Besides the above problems, a commercially available lubricant contains impurities which need to be eliminated. For example, a commercially available perfluoropolyether lubricant contains impurities of perfluoropolyether having a terminal group such as $-CF_2Cl$, $-CF_3$, or $-CF_2H$. These terminal groups exhibit a weaker polarity, as compared with a hydroxy group and a piperonyl group, which are the terminal groups intrinsic to a perfluoropolyether lubricant. If the content of the impurities is large, the adhesion and binding with a protective layer cannot be improved even if the molecular weight is large. Therefore, a refinement method to eliminate such impurities is required.

Japanese Unexamined Patent Application Publication No. 05-20673 discloses a method to refine a lubricant in which a technique is performed for refinement to control the molecular weight by using a gel permeation chromatography (GPC) method. Japanese Unexamined Patent Application Publication No. 11-199882 discloses a technique for refinement by controlling a molecular weight of a lubricant by using an organic solvent. A method to refine a lubricant using an organic solvent predominantly tends to eliminate highly polar and low molecular weight components. Consequently, the lubricant refined by the method may exhibit an increased proportion of the perfluoropolyether having a terminal group of $-CF_2Cl$, $-CF_3$, or $-CF_2H$ that shows a low solubility in an organic solvent. Japanese Unexamined Patent Application Publication No. 2001-164279 discloses a refinement method to increase the proportion of molecules having terminal groups that are intrinsic to a perfluoropolyether lubricant by applying supercritical fluid chromatography (SFC). While the reference states that the method is less expensive than a method using an organic solvent and achieves a higher productivity than a GPC method, problems may arise due to the cost and durability of a packing column in the SFC method when the mass treated in one process increases.

Further, a commercially available lubricant also includes ionic impurities as well as the above-described perfluoropolyether that has a weak polarity. The ionic impurities included in a lubricant existing on a recording medium causes corrosion, which induces dissolution of ions of metallic elements, such as cobalt, used in a magnetic layer. The cobalt ions catalyze decomposition of perfluoropolyether molecules used in the lubricant. Therefore, it is desirable to minimize the quantity of the ionic impurities.

Thus, the ionic impurities introduced into perfluoropolyether in its synthesis process need to be eliminated.

SUMMARY OF THE INVENTION

An aspect of the present invention is to provide a method to refine a lubricant that exhibits excellent lubrication performance and high stability in long term use, and is applicable to a magnetic recording medium. Another aspect of the present invention is to provide a lubricant that exhibits excellent lubrication performance and high stability in long term use using such a method for refinement. Still another aspect of the present invention is to provide a magnetic recording medium that exhibits excellent lubrication performance and high stability in long term use applying such a lubricant.

The above aspects are variously achieved by embodiments of the present invention as described below.

In a first embodiment of the present invention, a method is used to refine a perfluoropolyether lubricant using a supercritical extraction method that utilizes carbon dioxide in a supercritical fluid state (referred to as "supercritical carbon dioxide" herein).

In the first embodiment of the present invention, the method is used to refine a lubricant containing a compound having a perfluoropolyether structure by using supercritical extraction, wherein the lubricant contacts an extracting medium of supercritical carbon dioxide under a predetermined condition in a pressure vessel to remove ionic impurities from the lubricant. The first embodiment of the refinement method is conducted under a predetermined condition at such a temperature and pressure that the density of the supercritical carbon dioxide is less than or equal to the density of supercritical carbon dioxide at the temperature of 60° C. and the pressure of 20 MPa. The density in the boundary state is about 0.7 g/cm$^3$.

The ionic impurities in such a refinement method may, for example, be sodium ions, potassium ions, chloride ions, $HCO_3$ ions, $HSO_4$ ions, or sulfate ions.

In a second embodiment of the present invention, a method refines a lubricant containing a compound having a perfluoropolyether structure by using supercritical extraction, wherein the lubricant contacts an extracting medium of supercritical carbon dioxide under a predetermined condition in a pressure vessel to remove, from the components of the perfluoropolyether lubricant, perfluoropolyether compounds having a terminal group with a weak polarity. The second embodiment of the present invention is conducted under a predetermined condition at such temperature and pressure that the density of the supercritical carbon dioxide is less than or equal to the density of supercritical carbon dioxide at the temperature of 60° C. and the pressure of 16 MPa. The density in the boundary state is about 0.6 g/cm$^3$. The perfluoropolyether compounds having a terminal group with a weak polarity in the second embodiment of the present invention for the refinement method have a terminal group of weak polarity such as —$CF_3$, —$CF_2H$, or —$CF_2Cl$, for example.

In a third embodiment of the present invention, a method refines a lubricant comprising a compound having a perfluoropolyether structure by using supercritical extraction, wherein the lubricant contacts an extracting medium of supercritical carbon dioxide under a first condition in a pressure vessel to remove, from the components of the perfluoropolyether lubricant, perfluoropolyether compounds having a terminal group with a weak polarity, and then, the lubricant from which perfluoropolyether compounds having a terminal group of weak polarity have been removed contacts an extracting medium of supercritical carbon dioxide under a second condition in the pressure vessel to remove ionic impurities and to extract and recover the refined perfluoropolyether lubricant. In the third embodiment of the present invention, the first condition may, for example, be a combination of a temperature and a pressure at which a density of the supercritical carbon dioxide is less than or equal to the density of supercritical carbon dioxide at a temperature of 60° C. and a pressure of 16 MPa (the density is about 0.6 g/cm$^3$), and the second condition may, for example, be a combination of a temperature and a pressure at which a density of the supercritical carbon dioxide is less than or equal to the density of the supercritical carbon dioxide at a temperature of 60° C. and a pressure of 20 MPa (the density is about 0.7 g/cm$^3$). In the third embodiment of the present invention, the perfluoropolyether compound having a terminal group with a weak polarity has a terminal group of weak polarity such as —$CF_3$, —$CF_2H$, or —$CF_2Cl$, and the ionic impurities may, for example, be sodium ions, potassium ions, chloride ions, $HCO_3$ ions, $HSO_4$ ions, or sulfate ions.

In one aspect, a perfluoropolyether lubricant may be refined by the method to refine a lubricant according to above-described first embodiment of the present invention.

In a fourth embodiment of the present invention, a magnetic recording medium comprises a nonmagnetic underlayer, a magnetic layer, and a protective layer, that are sequentially laminated on a magnetic substrate, and a lubricant layer that is applied thereto, wherein the lubricant layer comprises the above-described perfluoropolyether lubricant of an embodiment of the present invention.

BRIEF DESCRIPTION OF THE DRAWINGS

These and/or other aspects will become apparent and more readily appreciated from the following description of the embodiments, taken in conjunction with the accompanying drawings, wherein like numerals refer to like parts throughout.

DETAILED DESCRIPTION OF THE EMBODIMENTS

Figure 1:
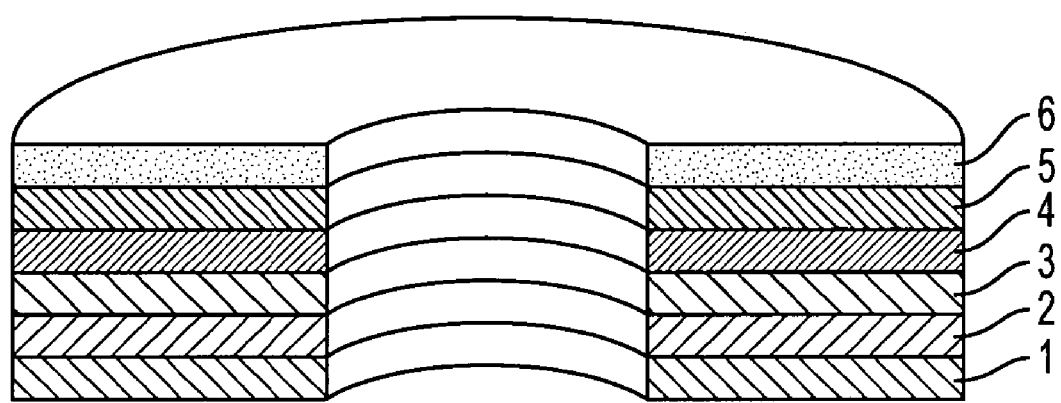
FIG. 1 is a schematic cross-sectional view of a magnetic recording medium according to an embodiment of the present invention.

The present invention is described below according to various embodiments thereof. The first embodiment of the present invention is described first. The first embodiment of the present invention is a method to refine a perfluoropolyether lubricant by using supercritical extraction that utilizes supercritical carbon dioxide.

Supercritical fluid continuously varies from a quite dilute low density state to a liquid-like high density state with a slight change of temperature and pressure. Since the dissolving ability of supercritical fluid depends on the density, the dissolving ability may be varied freely by controlling the temperature and the pressure.

The refinement method may be conducted in a temperature range of 31° C. to 100° C. While the pressure of 7.4 MPa is sufficient, the method may be performed in the pressure range up to 30 MPa for the above-mentioned temperature range. Within such a temperature range, the carbon dioxide is held in a supercritical state. A particularly favorable temperature range in which to carry out the refinement method of an embodiment of the present invention is 40° C. to 100° C. At a temperature below 40° C., a small variation of pressure greatly changes the dissolving ability of the supercritical carbon dioxide, resulting in difficulty in control. At a temperature over 100° C., a large variation of pressure is necessary to vary the dissolving ability of the supercritical carbon dioxide, requiring a significant amount of time for control. The above-specified temperature and pressure range corresponds to the range of about 0.4 $g/cm^3$ to about 0.9 $g/cm^3$ of the density of the supercritical carbon dioxide. In accordance with embodiments of the present invention, the dissolving ability may be changed freely in the range corresponding to the above-described temperature and pressure range by controlling such parameters. Consequently, a state of the supercritical carbon dioxide having a desired density, which corresponds to a desired dissolving ability, may be generated by controlling the temperature and the pressure. According to embodiments of the present invention, a perfluoropolyether lubricant contacts the supercritical carbon dioxide to extract a desired lubricant component. Refinement of the lubricant according to embodiments of the present invention may be performed based on the differences in molecular weight or the functional groups of the perfluoropolyether, or based on a small difference in the properties, e.g., the polarity, of compounds or ions contained in the lubricant.

Refining methods of embodiments of the present invention may be classified into first, second, and third embodiments according to the component to be removed and the component to be extracted, as described below.

The first embodiment of the present invention is a method that utilizes supercritical extraction to refine a perfluoropolyether lubricant by removing ionic impurities from the lubricant. Ionic impurities, when contained in the lubricant, decompose the lubricant, raising a problem with respect to long term stability. Accordingly, a long term stability of the lubricant is secured by removing the ionic impurities and preventing the lubricant from decomposing. The removal of ionic impurities from the lubricant is achieved by extraction using a supercritical carbon dioxide at a density less than or equal to a predetermined upper limit.

Ionic impurities that may be removed by a method of an embodiment of the present invention include metallic ions, for example, sodium ions and potassium ions, and inorganic ions, for example, chloride ions, $HCO_3$ ions, $HSO_4$ ions, and sulfate ions. In addition, organic ions, for example, ammonium ions, oxalic ions, and formic ions, may be removed as well according to embodiments of the present invention.

A specific description of the first embodiment is given below.

In the first embodiment of the present invention, a method is used to refine a perfluoropolyether lubricant by utilizing supercritical extraction, wherein the lubricant contacts an extracting medium of supercritical carbon dioxide under a predetermined condition in a pressure vessel to remove ionic impurities from the lubricant. More specifically, the first embodiment of the present invention utilizes a refinement method that comprises: introducing a perfluoropolyether lubricant into a pressure vessel, contacting the lubricant with supercritical carbon dioxide under a predetermined condition in the pressure vessel to extract perfluoropolyether compounds, and recovering the perfluoropolyether compounds obtained.

The first embodiment of the present invention is further described below.

In the first embodiment of the present invention, the method is a supercritical extraction method using an extraction medium of supercritical carbon dioxide. The method is based on the fact that the solubility of a polar component in supercritical carbon dioxide may be suppressed to a low level in the conditions described below.

Operation (a)

A raw material of a perfluoropolyether lubricant is introduced into a pressure vessel.

The pressure vessel comprises an inlet part through which an extracting medium of supercritical carbon dioxide is introduced, an outlet part through which the medium and extracted substance are taken out, and a control part that controls the temperature and pressure in the vessel at desired values. A vessel and a device that meet the above requirements include, for example, a stainless steel vessel with a thick wall having inlet and outlet ports, a pump for circulating supercritical carbon dioxide, for example, SCF-Get manufactured by JASCO Corporation, a fully automatic pressure regulator valve, for example, SCF-Bpg manufactured by JASCO Corporation, and a column oven as is commonly used in chromatography. A capacity of the pressure vessel may be selected corresponding to the lubricant to be refined, and is not limited to any special value.

A lubricant that may be treated in a refinement method according to an embodiment of the present invention is a perfluoropolyether lubricant having a polar group, for example, a piperonyl group, a hydroxy group, a carboxyl group, an ester group, an amino group, or a cyclophosphazen group. Specific examples of such a lubricant are 'Fomblin Z tetraol', and 'AM3001', which are commercially available from Ausimont KK. A predetermined quantity of such a raw material is introduced into a pressure vessel through an inlet part of the vessel.

Operation (b)

The lubricant introduced in the pressure vessel contacts an extracting medium of supercritical carbon dioxide, and perfluoropolyether compounds are extracted, removing ionic impurities.

The extracting medium is supercritical carbon dioxide. The supercritical carbon dioxide flows through the pressure vessel at a predetermined rate and contacts the raw lubricant in the vessel.

While operation (b) may be conducted in the temperature and pressure range corresponding to the density range of supercritical carbon dioxide at 0.4 to 0.9 $g/cm^3$ as mentioned previously, the operation is preferably conducted within a more confined temperature and pressure in that range. The preferable temperature and pressure in conformity with the first embodiment of the present invention are the temperature and pressure that allow the state with the density of the supercritical carbon dioxide of less than or equal to about 0.7 $g/cm^3$. Specific examples of the boundary temperature and pressure may be 60° C., 20 MPa and 100° C., 26 MPa. By contacting the lubricant with the supercritical carbon dioxide under such conditions, the perfluoropolyether compound components are selectively extracted, and ionic impurities remain in the residue in the vessel.

A flow rate of the supercritical carbon dioxide in this operation varies with the extraction condition and a target compound to be extracted, and is not limited to a specific value. However, a flow rate that allows sufficient contact between the lubricant and the supercritical carbon dioxide is desired. A preferable flow rate is in the range of 1 mL/min to 100 mL/min per 100 g of the lubricant, and more preferably, is in the range of 10 mL/min to 50 mL/min per 100 g of the lubricant. An excessively low flow rate causes a problem of a low processing speed. An excessively high flow rate causes a decrease of extraction efficiency and raises a problem of unnecessary consumption and may cause a problem that the lubricant is driven out unless the vessel volume is increased.

Operation (c).

The extracted perfluoropolyether compounds are collected together with the supercritical carbon dioxide to recover the perfluoropolyether compounds. The perfluoropolyether compounds and the supercritical carbon dioxide are removed through an outlet port of the pressure vessel. After the separation and after restoring a normal temperature and pressure, refined perfluoropolyether lubricant may be recovered. The carbon dioxide may be recovered and recycled as required.

In the manner described above, a perfluoropolyether lubricant may be refined by removing ionic impurities from the lubricant. The above-mentioned lubricants available from Ausimont KK may be refined by removing ionic impurities of, for example, sodium ions, potassium ions, chloride ions, $HCO_3$ ions, $HSO_4$ ions, and sulfate ions.

The refined perfluoropolyether lubricant may be used as a lubricant in a magnetic recording medium according to an embodiment of the present invention as described below. Because a lubricant refined by the above-described embodiment of the present invention contains a reduced amount of ionic impurities, a magnetic recording medium having an excellent long term stability may be provided when such a lubricant is used for material of a lubricant layer of the magnetic recording medium.

Next, a second embodiment of the present invention will be described. In the second embodiment of the present invention, a method is utilized to refine a perfluoropolyether lubricant by removing, from the lubricant, perfluoropolyether compounds having a terminal group with a weak polarity. To improve adhesion and bonding of a perfluoropolyether lubricant with a protective layer, it is effective to use a lubricant that predominantly includes perfluoropolyether compounds that have a terminal group that exhibits high adhesiveness and bonding characteristics with the protective layer. When the lubricant includes perfluoropolyether compounds that have a terminal group with a weak polarity, such compounds need to be extracted and removed to improve adhesion and bonding with the protective layer. The second embodiment of the present invention provides a refinement method in which the compounds that may be removed include perfluoropolyether compounds having a terminal group such as $-CF_3$, $-CF_2Cl$, or $-CF_2H$.

The second embodiment of the present invention is specifically described below. The second embodiment of the present invention is a method to refine perfluoropolyether lubricant by using supercritical extraction, wherein the lubricant contacts an extracting medium of supercritical carbon dioxide under a predetermined condition in a pressure vessel to remove, from the lubricant, perfluoropolyether compounds exhibiting weak polarity. More specifically, the second embodiment of the present invention provides a refinement method that comprises: introducing a perfluoropolyether lubricant into a pressure vessel, contacting the lubricant with supercritical carbon dioxide under a predetermined condition in the pressure vessel to extract perfluoropolyether compounds having a terminal group with weak polarity, and recovering the perfluoropolyether compounds remaining.

The second embodiment of the present invention is described more specifically below.

Operation (a)

Operation (a) is the same as operation (a) in the first embodiment described above. The vessel and the lubricant to be refined are also the same as in the first embodiment.

Operation (b)

The lubricant introduced into the pressure vessel contacts the extracting medium of supercritical carbon dioxide, to extract and remove perfluoropolyether compounds having a terminal group with weak polarity.

The extracting medium is supercritical carbon dioxide. The supercritical carbon dioxide flows through the pressure vessel at a predetermined rate and contacts the raw lubricant in the vessel.

While operation (b) may be conducted in the temperature and pressure range corresponding to the density range of supercritical carbon dioxide at 0.4 to 0.9 $g/cm^3$ as mentioned previously, operation (b) is preferably conducted within a confined temperature and pressure in that range. The preferable temperature and pressure in conformity with the second embodiment of the present invention are the temperature and pressure that allow the state with the density of the supercritical carbon dioxide of less than or equal to about 0.6 $g/cm^3$. Specific examples of the boundary temperature and pressure may be 60° C., 16 MPa, and 100° C., 22 MPa. By contacting the lubricant with the supercritical carbon dioxide under such conditions, the perfluoropolyether compounds having a terminal group with weak polarity are selectively extracted and removed. The refined lubricant remains in the vessel.

A flow rate of the supercritical carbon dioxide in operation (b) varies with the extraction condition and a target compound to be extracted, and is not limited to a specific value. However, a flow rate that allows enough contact between the lubricant and the supercritical carbon dioxide is desired. A preferable flow rate is in the range of 1 mL/min to 100 mL/min per 100 g of the lubricant, more preferably, 10 mL/min to 50 mL/min per 100 g of the lubricant. An excessively low flow rate causes a problem of low processing speed. An excessively high flow rate causes a decrease of extraction efficiency and raises a problem of unnecessary consumption as well as a problem that the lubricant is driven out unless the vessel volume is increased.

Operation (c)

The perfluoropolyether lubricant remaining in the vessel is recovered. The perfluoropolyether lubricant is recovered by stopping the supply of the supercritical carbon dioxide and returning the state in the vessel to the normal temperature and pressure.

As described above, perfluoropolyether lubricant may be refined by removing perfluoropolyether compounds with a weak polarity from the lubricant.

When the raw lubricant mentioned in the first embodiment above is used, the perfluoropolyether lubricant refined by the second embodiment mainly includes the perfluoropolyether compounds having a highly polar terminal group, such as a piperonyl group or a hydroxy group.

The refined perfluoropolyether lubricant may be used for a lubricant in a magnetic recording medium according to an embodiment of the invention as described below. Because a lubricant refined by the second embodiment contains a reduced amount of perfluoropolyether compounds having a terminal group with a weak polarity, a magnetic recording medium having excellent adhesion and bonding of the lubricant may be provided when such a lubricant is used for the material of a lubricant layer of the magnetic recording medium. Since perfluoropolyether compounds having a terminal group with a weak polarity are removed from the lubricant that is refined according to embodiments of the present invention, the refined lubricant achieves a strong adhesion and bonding with a protective layer of a magnetic recording medium as compared with utilizing an unrefined lubricant having the same molecular weight. Thus, a sufficiently heat-resistant lubricant layer may be formed.

A third embodiment of the present invention will now be described. The third embodiment of the present invention provides a method to refine perfluoropolyether lubricant by removing both perfluoropolyether compounds having a weak polarity terminal group and ionic impurities from the lubricant. In the third embodiment, a single refinement process may remove both perfluoropolyether compounds having a weak polarity terminal group and ionic impurities; thus, the method of the third embodiment achieves a high productivity.

The third embodiment of the present invention is specifically described below. The third embodiment utilizes a method to refine a perfluoropolyether lubricant by supercritical extraction, wherein the lubricant contacts an extracting medium of supercritical carbon dioxide under a first condition in a pressure vessel to extract and remove perfluoropolyether compounds having a weak polarity terminal group from the lubricant, and then the lubricant from which perfluoropolyether compounds having a weak polarity terminal group have been removed contacts an extracting medium of supercritical carbon dioxide under a second condition to extract and recover the perfluoropolyether lubricant while removing ionic impurities. More specifically, the third embodiment of the present invention provides a refinement method that comprises: introducing a perfluoropolyether lubricant into a pressure vessel, contacting the lubricant with supercritical carbon dioxide under a first condition in the pressure vessel to extract perfluoropolyether compounds having a weak polarity terminal group, and contacting, after extracting the perfluoropolyether compounds having a weak polarity terminal group, the perfluoropolyether lubricant remaining with supercritical carbon dioxide under a second condition to extract and recover the perfluoropolyether lubricant.

The third embodiment is described more specifically below.

Operation (a)

Operation (a) of the third embodiment is the same as operation (a) in the first embodiment described above. The vessel and the lubricant to be refined are also the same as described in the first embodiment.

Operation (b)

The lubricant introduced into the pressure vessel contacts the extracting medium of supercritical carbon dioxide under a first condition to extract and remove perfluoropolyether compounds having a weak polarity terminal group. When the raw material is the lubricant described in the first embodiment above, the perfluoropolyether compounds having a terminal group of —$CF_3$, —$CF_2Cl$, or —$CF_2H$, for example, are removed.

The extracting medium is supercritical carbon dioxide. The supercritical carbon dioxide flows through the pressure vessel at a predetermined rate and contacts the raw lubricant in the vessel.

Extraction in operation (b) of the third embodiment is conducted under the first condition. While the first condition may be in the temperature and pressure range corresponding to the density range of supercritical carbon dioxide at 0.4 to 0.9 $g/cm^3$ as mentioned previously, operation (b) is preferably conducted at a temperature and pressure in which the density of the supercritical carbon dioxide is less than or equal to about 0.6 $g/cm^3$. This upper limit of the density corresponds to a specific temperature and pressure of, for example, 60° C., 16 MPa, or 100° C., 22 MPa,. By contacting the lubricant with the supercritical carbon dioxide under such a condition, the components of perfluoropolyether compound having a weak polarity terminal group are selectively extracted.

A flow rate of the supercritical carbon dioxide in operation (b) of the third embodiment varies with the extraction condition and a target compound to be extracted, and is not limited to a specific value. However, a flow rate that allows sufficient contact between the lubricant and the supercritical carbon dioxide is desired. The preferable flow rate is in a range of 1 mL/min to 100 mL/min per 100 g of the lubricant, more preferably, 10 mL/min to 50 mL/min per 100 g of the lubricant. An excessively low flow rate causes a problem of low processing speed. An excessively high flow rate causes a decrease of extraction efficiency, raises a problem of unnecessary consumption, and may cause a problem that the lubricant is driven out unless the vessel volume is increased.

After the extraction operation (b), perfluoropolyether compounds having a high polarity group remain in the vessel.

Operation (c).

The components of the lubricant remaining in the vessel contact the extraction medium of supercritical carbon dioxide to extract the perfluoropolyether compounds having a terminal group with a higher polarity.

The extracting medium is supercritical carbon dioxide. The supercritical carbon dioxide flows through the pressure vessel at a predetermined rate and contacts the lubricant components in the vessel.

The extraction in operation (c) is conducted under the second condition. While the second condition may be in the temperature and pressure range corresponding to the density range of supercritical carbon dioxide at 0.4 to 0.9 $g/cm^3$, as mentioned previously, this operation is preferably conducted at a temperature and pressure in which the density of the supercritical carbon dioxide is less than or equal to about 0.7 $g/cm^3$. The upper limit of the density corresponds to a specific temperature and a pressure of, for example, 60° C., 20 MPa, or 100° C., 26 MPa. Because operation (c) extracts perfluoropolyether having a terminal group with a higher polarity than the perfluoropolyether extracted in operation (b), an additional condition of the temperature and pressure is preferably utilized in which the density of supercritical carbon dioxide is higher than the upper limit density of supercritical carbon dioxide in operation (b), as well as being compliant with the second condition. That is, the condition of the temperature and pressure in operation (c)

are most preferably selected such that the density of the supercritical carbon dioxide in operation (c) is 0.6 g/cm$^3$ to 0.7 g/cm$^3$.

By contacting the lubricant with the supercritical carbon dioxide under such a condition, the components of perfluoropolyether compounds are selectively extracted, and the ionic impurities remain in the residue in the vessel.

A flow rate of the supercritical carbon dioxide in this operation varies with the extraction condition and a target compound to be extracted, and is not limited to a specific value. However, a flow rate that allows sufficient contact between the lubricant and the supercritical carbon dioxide is desired. The preferable flow rate is in the range of 1 mL/min to 100 mL/min per 100 g of the lubricant, more preferably, 10 mL/min to 50 mL/min per 100 g of the lubricant. An excessively low flow rate causes a problem of low processing speed. An excessively high flow rate causes a decrease of the extraction efficiency, raises a problem of unnecessary consumption, and may cause a problem that the lubricant is driven out unless the vessel volume is increased.

Further in operation (c), the extracted perfluoropolyether compounds are collected together with the supercritical carbon dioxide to recover the perfluoropolyether compounds. The perfluoropolyether compounds and the supercritical carbon dioxide are removed through an outlet port of the pressure vessel and are separated by returning conditions to the normal temperature and pressure. The separated perfluoropolyether compounds are recovered, obtaining the refined perfluoropolyether lubricant. The carbon dioxide may be recovered and recycled as required.

As described above, the lubricant may be refined by removing ionic impurities and perfluoropolyether compounds having a weak polarity terminal group from the perfluoropolyether lubricant.

The perfluoropolyether lubricant refined by the third embodiment of the present invention, when the raw lubricant described in the first embodiment above is used, mainly includes the perfluoropolyether compounds having a terminal group with a higher polarity, such as a piperonyl group or a hydroxy group. At the same time, ionic impurities including sodium ions, potassium ions, chloride ions, $HCO_3$ ions, $HSO_4$ ions, and sulfate ions have been removed from the refined lubricant.

The refined perfluoropolyether lubricant may be used for a lubricant in a magnetic recording medium according to embodiments of the present invention as described below. Because the lubricant refined by the third embodiment contains a reduced amount of perfluoropolyether compounds having a weak polarity terminal group, and ionic impurities are also removed from the refined lubricant, when the refined lubricant is used for the material of a lubricant layer, a magnetic recording medium may be provided that achieves an excellent adhesion and bonding of the lubricant, and thus superior heat resistance and long term stability.

The refinement method according to embodiments of the present invention refines a lubricant not by a separation means, such as a column using packing materials, but by the method described herein. Consequently, the method is inexpensive, superior in durability, and as a result, achieves high productivity. In particular, the method according to embodiments of the present invention is versatile and is applicable to refine small to large amounts of lubricant, as described below in the examples. The method according to embodiments of the present invention allows a lubricant to be refined based on a difference in molecular weight or a functional group of perfluoropolyether, or a small difference in polarity of compounds and ions contained in the lubricant. Besides, the refinement method according to embodiments of the present invention may be applied to both a batch system and a continuous system by appropriate selection of a vessel and other items.

In the fourth embodiment, a lubricant that is refined by a method described above is used for a magnetic recording medium. Specifically, the lubricant used for the magnetic recording medium may be refined by removing ionic impurities, by removing perfluoropolyether components having a weak polarity terminal group, or by removing both ionic impurities and perfluoropolyether components having a weak polarity terminal group.

A lubricant according to an embodiment of the present invention is a lubricant with an increased content of perfluoropolyether compounds having a terminal group with a high polarity obtained by separating out perfluoropolyether compounds based on the differences in polarity between the terminal groups of perfluoropolyether molecules and the differences in polarity between ionic impurities and perfluoropolyether compounds. Consequently, adhesiveness and bonding strength of the lubricant with a protective layer is enhanced, and as a result, spin migration is suppressed and vaporization of the lubricant by heat is prevented.

Because ionic impurities that cause decomposition of the lubricant are eliminated in the lubricant according to embodiments of the present invention, the decomposition of the lubricant is suppressed, assuring long term stability. Ionic impurities that are contained in an unrefined lubricant mentioned in the description of the first embodiment may, for example, be $Na^+$, $K^+$, $Cl-$, $HCO_3-$, $SO_4^{2-}$, or $HSO_4-$.

Another embodiment is a magnetic recording medium using a lubricant refined as described herein.

FIG. 1 is a schematic cross-sectional view of a magnetic recording medium according to embodiments of the present invention. As shown in FIG. 1, a magnetic recording medium according to an embodiment of the invention comprises a nonmagnetic underlayer 3, a magnetic recording layer 4, a protective layer 5, and a lubricant layer 6 sequentially formed on a substrate.

As shown in FIG. 1, the substrate preferably comprises a nonmagnetic base plate 1 and a plating layer 2, a nickel-phosphorus (Ni—P) plating layer, for example, formed on the base plate by electroless plating. (The combination of the nonmagnetic base plate 1 and the plating layer 2 is referred to as a substrate herein.)

The nonmagnetic base plate 1 is typically formed with a material used in a conventional magnetic recording medium. For example, a material used for the base plate 1 may be an aluminum alloy, strengthened glass, crystallized glass, or plastic.

A nonmagnetic underlayer 3, a magnetic layer 4, a protective layer 5, and a lubricant layer 6 are sequentially formed on the substrate to produce a magnetic recording medium.

Conventional materials may be used for the nonmagnetic underlayer 3, the magnetic layer 4, and the protective layer 5. Specifically, for example, the nonmagnetic underlayer 3 may be an underlayer composed of chromium; the magnetic layer 4 may be composed of a cobalt alloy, for example, a ferromagnetic alloy of Co—Cr—Ta or Co—Cr—Pt; and the protective layer 5 may be a carbon protective layer.

The lubricant layer 6 is essentially composed of a perfluoropolyether lubricant that is refined by a refinement method according to an embodiment of the present invention.

Although a magnetic recording medium according to an embodiment of the present invention is described above by referring to FIG. 1, the structure of FIG. 1 is only an example of a structure of a magnetic recording medium according to an embodiment of the present invention and variations are possible that comply with each aspect of the recording medium. A shape of the medium may be adapted for a device that uses the medium, and is not limited to a specific shape. An example may be a disk shaped magnetic recording medium mounted on a hard disk drive (HDD).

A manufacturing process of a magnetic recording medium of an embodiment of the present invention includes coating the substrate described above with a nonmagnetic underlayer 3, and sequentially laminating a magnetic layer 4 and a protective layer 5 on the underlayer 3. Then, a lubricant according to an embodiment of the present invention is applied to the surface of the protective layer 5.

The nonmagnetic underlayer 3 is preferably a chromium layer, and the magnetic layer 4 is preferably a cobalt alloy layer in an embodiment of he present invention.

The nonmagnetic underlayer 3, the magnetic layer 4, and the protective film 5 may be formed by a direct current (DC) sputtering method when the three layers are a chromium nonmagnetic underlayer, a cobalt magnetic alloy layer, and a carbon protective layer, respectively. The carbon protective layer may be either a carbon protective layer mainly composed of graphite or a data line control (DLC) protective layer. The lubricant layer 6 may be applied by, for example, dip-coating or spin-coating. For thicknesses and deposition conditions of the nonmagnetic underlayer 3, the magnetic layer 4, the protective layer 5, and the lubricant layer 6, the same conditions as are known in the art for magnetic recording media may be employed. The construction described above shall not limit the present invention.

EXAMPLES

Various implementations will be described more in detail by referring to examples of embodiments of the present invention. The present invention, however, is not limited by the examples. Examples of a perfluoropolyether lubricant in the following examples of embodiments are "Fomblin Z tetraol (also simply referred to as Z-tetraol)", and "AM3001", which are commercially available from Ausimont KK.

Example 1

Forty grams of lubricant Z-tetraol was placed in an extraction vessel comprising a stainless steel vessel with a thick wall provided with inlet and outlet ports, and having a content volume of 80 mL. Supercritical carbon dioxide was passed through the vessel at a flow rate of 8 mL/min. The temperature was fixed at 60° C., and the pressure was changed with time. The extraction components of ZT60-1 to ZT60-10, as shown in Table 1, were obtained at each fraction of the pressure level. Table 1 also shows the pressure and the passage of time.

TABLE 1

Extraction of Z-tetraol at 60° C.

| sample | pressure (MPa) | time (min) | mass (g) |
|---|---|---|---|
| ZT60-1 | 10.0→ 11.0→ 11.5→ 12.0→ 12.5→ 13.0 | 7→ 5→ 5→ 5→ 5→ 20 | 3.51 |
| ZT60-2 | 14.0 | 20 | 4.12 |
| ZT60-3 | 15.0 | 20 | 5.38 |
| ZT60-4 | 16.0 | 20 | 7.27 |
| ZT60-5 | 17.0 | 20 | 6.40 |
| ZT60-6 | 18.0 | 20 | 4.31 |
| ZT60-7 | 19.0→ 20.0 | 10→ 10 | 3.01 |
| ZT60-8 | 22.0→ 24.0→ 26.0 | 10→ 5→ 5 | 2.25 |
| ZT60-9 | 28.0→ 30.0 | 10→ 20 | 2.25 |
| ZT60-10 | residue | — | 1.03 |
| | | total mass | 39.53 |

Example 2

Forty grams of the lubricant (Z-tetraol) was placed in the same vessel as in Example 1, and the supercritical carbon dioxide was passed through the vessel at the same flow rate. The temperature was fixed at 100° C., and the pressure was changed with time. The extraction components of ZT100-1 to ZT100-11, as shown in Table 2, were obtained at each fraction of the pressure level. Table 2 also shows the pressure and the passage of time.

TABLE 2

Extraction of Z-tetraol at 100° C.

| sample | pressure (MPa) | time (min) | mass (g) |
|---|---|---|---|
| ZT100-1 | 10.0→ 11.0→ 12.0→ 13.0→ 14.0→ 15.0→ 16.0→ 17.0→ 18.0 | 5→ 5→ 5→ 5→ 5→ 5→ 5→ 5→ 5 | 0.78 |
| ZT100-2 | 19.0 | 20 | 2.31 |
| ZT100-3 | 20.0 | 20 | 3.32 |
| ZT100-4 | 21.0 | 20 | 4.24 |
| ZT100-5 | 22.0 | 20 | 6.27 |
| ZT100-6 | 23.0 | 20 | 7.32 |
| ZT100-7 | 24.0 | 20 | 6.80 |
| ZT100-8 | 25.0 | 20 | 3.41 |
| ZT100-9 | 26.0 | 20 | 1.76 |
| ZT100-10 | 27.0→ 30.0 | 3→ 20 | 1.45 |
| ZT100-11 | residue | — | 0.71 |
| | | total mass | 38.36 |

Example 3

Forty grams of the lubricant AM3001 was placed in the same vessel as in Example 1, and the supercritical carbon dioxide was passed through the vessel at the same flow rate. The temperature was fixed at 60° C., and the pressure was changed with time. The extraction components of AM60-1 to AM60-3, as shown in Table 3, were obtained at each fraction of the pressure level. Table 3 also shows the pressure and the passage of time.

TABLE 3

| Extraction of AM3001 at 60° C. | | | |
|---|---|---|---|
| Sample | pressure (MPa) | time (min) | mass (g) |
| AM60-1 | 13.0 | 40 | 16.5 |
| AM60-2 | 19.0 | 30 | 16.3 |
| AM60-3 | residue | — | 6.0 |
| | | total mass | 38.8 |

Example 4

Forty grams of the lubricant AM3001 was placed in the same vessel as in Example 1, and the supercritical carbon dioxide was passed through at the same flow rate. The temperature was fixed at 65° C., and the pressure was changed with time. The extraction components of AM65-1 to AM65-3, as shown in Table 4, were obtained at each fraction of the pressure level. Table 4 also shows the pressure and the passage of time.

TABLE 4

| Extraction of AM3001 at 65° C. | | | |
|---|---|---|---|
| Sample | pressure (MPa) | time (min) | mass (g) |
| AM65-1 | 13.0 | 40 | 12.0 |
| AM65-2 | 19.0 | 30 | 15.5 |
| AM65-3 | residue | — | 12.3 |
| | | total mass | 39.8 |

Example 5

Two hundred and fifty grams of lubricant AM3001 was placed in an extraction vessel comprising a stainless steel vessel with a thick wall having inlet and outlet ports and having a content volume of 450 mL. Supercritical carbon dioxide was passed through the vessel at the flow rate of 20 mL/min. The temperature was fixed at 63° C., and the pressure was maintained at 14.5 MPa for 60 min. 100 g of the fraction extracted during this period was removed. Then, the pressure was increased to 16 MPa and held for 40 min. to obtain 100 g of a target component. The molecular weight of the target component was measured by a gel permeation chromatography (GPC) method to obtain the number average molecular weight Mn of 3,400 and the weight average molecular weight Mw of 3,900.

The content of the ionic impurities of the sample before and after the refinement process was measured by ion chromatography. The sample after the refinement process is the above-mentioned target component. The resulting content of sodium ions decreased from 1.4 ppm to 0.3 ppm, potassium ions decreased from 1.0 ppm to 0.05 ppm, $HSO_4$ ions decreased from 0.03 ppm to below detection limit of 0.01 ppm, and chloride ions decreased from 0.07 ppm to 0.04 ppm. Ammonium ions, nitric ions, formic ions, and oxalic ions were scarcely detected in samples both before and after the refinement process.

Comparative Example 1

The commercial lubricant AM3001, as supplied and not refined, was used as the Comparative Example 1 for the following tests.

Comparative Example 2

Forty grams of the lubricant AM3001 and 40 g of butyl acetate were mixed and stirred at 60° C. (fixed) for 30 min. After standing for 12 hr, the lower portion of the mixture was separated by a separatory funnel. The butyl acetate remaining in the lower portion was eliminated by an evaporator, and 20 g of the refined lubricant (hereinafter described as "butyl acetate-refined AM") was obtained.

Evaluation

1. Analysis Results by Means of Time of Flight Secondary Ion Mass Spectroscopy (TOF-SIMS)

A few micrograms of each of the extraction fractions from Example 1 and Example 2, and a sample of Comparative Example 1 were each dropped on the surface of a magnetic recording medium not coated with lubricant. Analysis was conducted on the surfaces by TOF-SIMS. The results are shown in Table 5. Table 5 shows fragments of anions and cations for various types of fragments detected in the extracted fractions and the sample. Each figure in the Table indicates a quantity of the fragments and is a number of counts per unit time detected by the TOF-SIMS.

TABLE 5

| | Detected ions by TOF-SIMS | | | | |
|---|---|---|---|---|---|
| | cation | | anion | | |
| component | K | Na | Cl | $HCO_3$ | $HSO_4$ |
| unrefined ZT | 45684 | 925 | 1793 | 57 | 462 |
| ZT60-1 | 304 | 56 | 3110 | 11 | 20 |
| ZT60-2 | 220 | 42 | 2040 | 3 | 39 |
| ZT60-3 | 171 | 20 | 1381 | 5 | 19 |
| ZT60-4 | 136 | 14 | 289 | 3 | 24 |
| ZT60-5 | 214 | 24 | 144 | 14 | 36 |
| ZT60-6 | 425 | 22 | 259 | 4 | 34 |
| ZT60-7 | 1211 | 51 | 193 | 9 | 21 |
| ZT60-8 | 6154 | 190 | 264 | 7 | 42 |
| ZT60-9 | 7157 | 333 | 519 | 15 | 74 |
| ZT60-10 | 107611 | 3269 | 2236 | 115 | 353 |
| ZT100-1 | 7261 | 215 | 5399 | 15 | 79 |
| ZT100-2 | 736 | 40 | 3544 | 5 | 18 |
| ZT100-3 | 350 | 16 | 2624 | 4 | 17 |
| ZT100-4 | 433 | 32 | 2154 | 7 | 25 |
| ZT100-5 | 552 | 20 | 937 | 2 | 23 |
| ZT100-6 | 531 | 15 | 340 | 4 | 27 |
| ZT100-7 | 349 | 7 | 263 | 0 | 25 |
| ZT100-8 | 387 | 19 | 261 | 5 | 28 |
| ZT100-9 | 1563 | 28 | 204 | 6 | 21 |
| ZT100-10 | 4574 | 69 | 455 | 12 | 40 |
| ZT100-11 | 102855 | 4584 | 2060 | 161 | 452 |

As Table 5 shows, the fragments of the cations were detected more frequently in the fractions extracted at high pressures and in the residue after extraction. The fragments of the anions $HCO_3^-$ and $HSO_4^-$ were detected more frequently in the residue after extraction. The fragments of the anion Cl⁻ were detected in the fractions extracted at low pressures (ZT60-1 to ZT60-3 and ZT100-1 to ZT100-4) in addition to being detected in the fraction extracted at high pressure. In the fractions obtained by low pressure extraction, ZT60-1 to ZT60-3 and ZT100-1 to ZT100-4, the fragment of $CF_2Cl$ was detected as well as the fragment of Cl. In contrast, in the fractions obtained by high pressure extraction, ZT60-9, and in the residues ZT60-10 and ZT100-11, the fragment of $CF_2Cl$ was not detected. Therefore, the Cl fragments in ZT60-9, ZT60-10, and ZT100-11 are attributable to chloride ions, while the Cl fragments in ZT60-1 to ZT60-3 and ZT100-1 to ZT100-4 originate from lubricant compounds, including $CF_2Cl^-$.

The above results show that the extraction with carbon dioxide at the temperature of 60° C. and a pressure higher than 20 MPa involves extraction of accompanying sodium ions, potassium ions, chloride ions, and $HSO_4$ ions, and causes an unfavorable condition for the lubricant. Likewise, the condition at the temperature of 100° C. and a pressure higher than 26 MPa also cause a similar result. Carbon dioxide, at either of these two boundary states of temperature and pressure, has the same density, 0.7 $g/cm^3$. Thus, it appears that supercritical carbon dioxide having a density higher than 0.7 $g/cm^3$ dissolves ionic impurities contained in the perfluoropolyether lubricant. Therefore, in order to remove the ionic impurities of the perfluoropolyether lubricant, supercritical extraction is preferably conducted using supercritical carbon dioxide under a condition corresponding to a density of supercritical carbon dioxide less than or equal to about 0.7 $g/cm^3$, that is, the density of supercritical carbon dioxide at 60° C., 20 MPa and 100° C., 26 MPa.

The behavior of Cl fragments shows that low pressure extraction fractions contain a weak polarity perfluoropolyether compound having a terminal group of $CF_2Cl^-$ that is a weak polarity group. Consequently, it appears that weak polarity perfluoropolyether compounds are abundantly contained in the fractions extracted at a condition corresponding to a density of supercritical carbon dioxide that is less than about 0.6 $g/cm^3$, that is, the density of supercritical carbon dioxide at 60° C., 16 MPa and 100° C., 22 MPa. Therefore, in order to remove weak polarity perfluoropolyether compounds of a perfluoropolyether lubricant, supercritical extraction is preferably conducted using supercritical carbon dioxide under a condition corresponding to a density of supercritical carbon dioxide less than or equal to the density of supercritical carbon dioxide at 60° C., 16 MPa, or at 100° C., 22 MPa. The boundary density is about 0.6 $g/cm^3$.

The results may be summarized as follows.

To remove ionic impurities, supercritical extraction is conducted using supercritical carbon dioxide under a condition corresponding to a supercritical carbon dioxide density less than or equal to the density of the supercritical carbon dioxide at 60° C., 20 MPa or 100° C., 26 MPa. The density at the boundary condition is about 0.7 $g/cm^3$.

To reduce the content of weak polarity perfluoropolyether compounds, supercritical extraction is conducted using supercritical carbon dioxide under a condition corresponding to a supercritical carbon dioxide density less than or equal to the supercritical carbon dioxide density at 60° C., 16 MPa, or at 100° C., 22 MPa. The boundary density is about 0.6 $g/cm^3$.

To obtain perfluoropolyether lubricant from which both ionic impurities and weak polarity perfluoropolyether compounds are removed, supercritical extraction is conducted using supercritical carbon dioxide, at first, under a condition corresponding to a density of supercritical carbon dioxide that is less than or equal to the density of supercritical carbon dioxide at 60° C., 16 MPa, or at 100° C., 22 MPa. The boundary density is about 0.6 $g/cm^3$. Subsequently, supercritical extraction is conducted using supercritical carbon dioxide under a condition corresponding to a density of supercritical carbon dioxide that is less than or equal to the density of supercritical carbon dioxide at 60° C., 20 MPa or 100° C., 26 MPa. The density at the boundary condition is about 0.7 $g/cm^3$.

The above-described extraction is possible because first, the supercritical carbon dioxide is a non-polar solvent, and second, the density of the supercritical carbon dioxide continuously changes with temperature and pressure from 0.4 $g/cm^3$ to 0.9 $g/cm^3$, and the dissolving ability also increases in accordance with the increase in density. Accordingly, other ionic impurities not exemplified above may also be separated, utilizing the difference between the solubility of a target lubricant component and the solubility of an ionic impurity in the supercritical carbon dioxide. Thus, metal ions, ammonium ions, and organic ions such as oxalic ions and formic ions may also be separated from the target lubricant component.

2. Measurement of Lubricant Properties

Lubricant properties have been measured by molecular weight measurement, supercritical fluid chromatography (SFC), measurement of the temperature at a 10% weight loss of lubricant by thermo gravimetric analysis (TG), and a spin-off test on a magnetic recording medium.

(i) Molecular Weight Measurement

Measurement of molecular weight was conducted on the samples of AM65-2 of Example 4, AM60-2 of Example 3, unrefined AM of Comparative Example 1, and butyl acetate-refined AM of Comparative Example 2. The measurement of the molecular weight was performed by known GPC methods to obtain a number average molecular weight Mn and a weight average molecular weight Mw. The results are shown in Table 6.

(ii) Measurement of the Terminal Groups by Supercritical Fluid Chromatography (SFC)

The lubricant fraction AM65-2 of Example 4 was subjected to SFC. Conditions of the SFC were as follows.

Mobile phase: $CO_2$ at 40° C., 20 MPa, flow rate: 3 mL/min

Injected mass of the sample: 5 μg

Detector: ELSD

A silica gel column was used.

Figure 2:
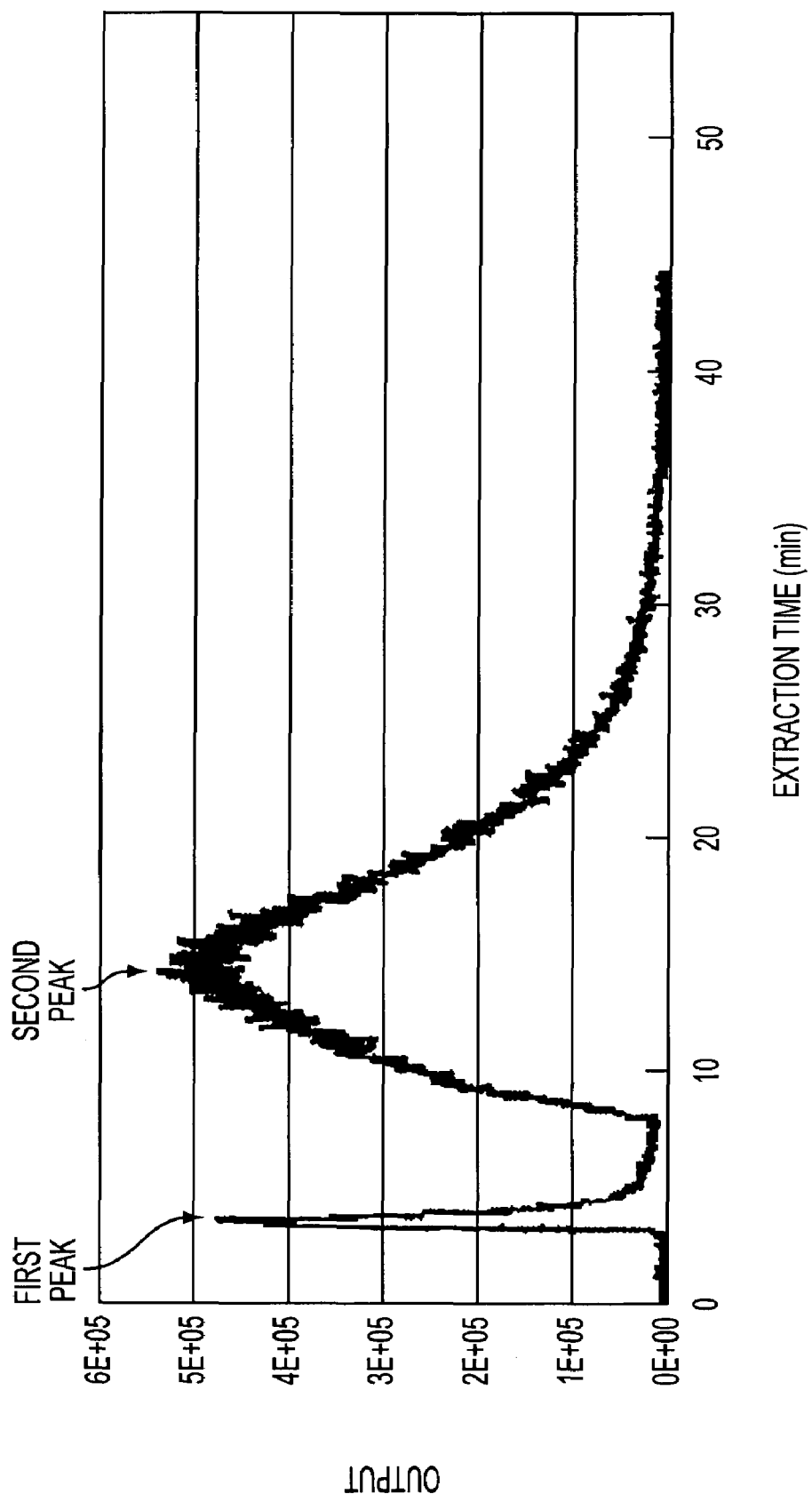
FIG. 2 is a graph showing a supercritical fluid chromatography (SFC) extraction of the lubricant AM65-2 in accordance with an embodiment of the present invention.

The chromatogram shown in FIG. 2 was obtained. The fraction corresponding to the first peak of the chromatogram was separated and subjected to analysis by means of TOF-SIMS. The separated fraction intensely showed the fragments of $CF_2Cl$ and $CF_2H$ and very weakly showed the fragment based on the piperonyl group, which is a terminal group of a highly polar perfluoropolyether compound. Consequently, the first peak appearing in the SFC may be attributed to lubricant molecules having a weak polarity terminal group. Since the $CF_3$ fragment in the TOF-SIMS develops from the principal chain of the lubricant as well, existence of a lubricant component having a terminal group of $CF_3^-$ is unclear. However, if such a component exists, the component must be contained in the first peak because of the properties of SFC. The areal proportion of the first peak with respect to the total peaks was calculated on the AM65-2.

The areal proportion of the first peak with respect to the total peaks was calculated on the samples of AM60-2 of Example 3, unrefined AM of Comparative Example 1, and butyl acetate-refined AM of Comparative Example 2, as well as on the AM65-2 of Example 4.

(iii) Measurement of the Temperature at 10% Weight Loss of Lubricant by Thermo Gravimetric Analysis (TG)

Analysis by the TG method was conducted to measure the weight loss of the lubricant due to heating. While heating each sample, the temperature when the weight of the lubricant had decreased by 10% was measured by the TG method and recorded. The measurements were conducted on the samples of AM65-2 of Example 4, AM60-2 of Example 3, unrefined AM of Comparative Example 1, and butyl acetate-refined AM of Comparative Example 2. The results are shown in Table 6.

(iv) Spin-off Test of Magnetic Recording Media

Spin-off tests were conducted on the samples of AM65-2 of Example 4, AM60-2 of Example 3, unrefined AM of Comparative Example 1, and butyl acetate-refined AM of Comparative Example 2.

Ni—P plating was executed by electroless plating to form a plating layer on a nonmagnetic base plate of aluminum-magnesium alloy. After polishing the surface, nearly concentric grooves with the surface roughness Ra of 0.8 nm were formed by texturing using a diamond slurry. After cleaning, the substrate was put into a sputtering apparatus as is known in the art, in which were formed, by a chemical vapor deposition (CVD) method, a nonmagnetic underlayer of chromium, a magnetic layer comprising Co, Cr, Ta, and Pt, and a protective layer of nitrogen-doped amorphous carbon (a-C:N) having a thickness of 8 nm. Thus, a magnetic recording disk having a diameter of 95 mm was obtained. The lubricant was applied by dip-coating on the magnetic recording disk to the thickness of 1.6 nm to complete a magnetic recording medium. The above-mentioned four types of lubricant were used for samples of the lubricant.

The spin-off test was executed by rotating the magnetic recording medium prepared as described above at 7,200 rpm for 120 hr in an environment having a temperature of 55° C. and a relative humidity of 80%. Variation of the film thickness (%) was obtained by measuring the thicknesses at the radius of 18 mm, which is within the CSS region, before and after the rotation test. Results are given in Table 6.

TABLE 6

Properties of the four types of lubricant

| | Mn | Mw | first peak area (*1) | temperature at 10% loss (*2), (° C.) | thickness change after spin-off test |
|---|---|---|---|---|---|
| unrefined AM | 3,000 | 3,900 | 14% | 302 | −14% |
| AM60-2 | 3,500 | 4,700 | 6% | 334 | −4% |
| AM65-2 | 3,100 | 3,600 | 7% | 324 | −10% |
| butyl acetate-refined AM | 3,900 | 4,800 | 18% | 329 | −10% |

(*1) area proportion of the first peak in the SFC
(*2) temperature at 10% weight loss of lubricant in TG analysis As Table 6 shows, the areal proportion of the first peak in the SFC of AM60-2 and AM65-2 that were refined by the method according to an embodiment of the present invention was reduced to half or lower than the proportion of the unrefined AM. The result confirms the reduction of components of lubricant molecules having a terminal group of weak polarity.

The molecular weights of AM60-2 and AM65-2 were smaller than the molecular weight of butyl acetate-refined AM, while the temperature at 10% loss of the lubricant and the spin-off test result were nearly the same as for the butyl acetate-refined AM. Accordingly, the lubricant refined by the method according to an embodiment of the present invention has a high bonding property, despite having a lower molecular weight. This result is caused by removal of components of the lubricant that have a weak polarity terminal group.

A magnetic recording medium using a lubricant refined by the method according to an embodiment of the present invention has a relatively small effect on a magnetic head, even a magnetic head with a relatively small flying height. Therefore, a magnetic recording medium using a lubricant according to an embodiment of the present invention achieves superior long term stability.

The method according to an embodiment of the present invention refines a lubricant by removing either one or both of ionic impurities and perfluoropolyether components having a weak polarity terminal group by controlling a state of carbon dioxide used in supercritical-fluid extraction. Thus, a refinement method with high productivity is provided. Embodiment of the present invention also provide a lubricant exhibiting a high bonding performance, despite having a low molecular weight, by employing the refining method. Further, lubrication performance of a magnetic recording medium in a fixed magnetic recording apparatus is improved by using the lubricant refined by the invented method. Thus, a magnetic recording medium achieving an excellent long term stability is provided.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly, modifications and equivalents are deemed to fall within the scope of the invention, which is defined in the claims and their equivalents.

What is claimed is:

1. A method to refine a lubricant comprising a compound having a perfluoropolyether structure, the method comprising:
   introducing a raw material of the lubricant into a pressurized vessel having an inlet part and an outlet part;
   contacting the raw material of the lubricant with a supercritical carbon dioxide under a predetermined condition in the pressurized vessel to remove ionic impurities from the lubricant, wherein the supercritical carbon dioxide is introduced from the inlet part and flows through the pressurized vessel at a predetermined rate; and
   recovering the lubricant, from which ionic impurities are removed, through the outlet part.

2. The method to refine a lubricant according to claim 1, wherein the predetermined condition is a combination of a temperature and a pressure at which a density of the supercritical carbon dioxide is less than or equal to a density of the supercritical carbon dioxide at a temperature of 60° C. and a pressure of 20 MPa.

3. The method to refine a lubricant according to claim 1, wherein the ionic impurities are included in the group consisting of sodium ions, potassium ions, chloride ions, $HCO_3$ ions, $HSO_4$ ions, and sulfate ions.

4. A method to refine a lubricant comprising a compound having a perfluoropolyether structure, the method comprising:

introducing a raw material of the lubricant into a pressurized vessel having an inlet part and an outlet part;

contacting the raw material of the lubricant with a supercritical carbon dioxide under a predetermined condition in the pressurized vessel to extract and remove a perfluoropolyether compound having a terminal group of weak polarity, wherein the supercritical carbon dioxide is introduced from the inlet part and flows through the pressurized vessel at a predetermined rate; and recovering the lubricant, from which the perfluoropolyether compound having a terminal group of weak polarity is removed, from the pressurized vessel.

5. The method to refine a lubricant according to claim 4, wherein the predetermined condition is a combination of a temperature and a pressure at which a density of the supercritical carbon dioxide is less than or equal to a density of the supercritical carbon dioxide at a temperature of 60° C. and a pressure of 16 MPa.

6. The method to refine a lubricant according to claim 4, wherein the perfluoropolyether compound having a terminal group of weak polarity is a perfluoropolyether compound having a terminal group included in the group consisting of —$CF_3$, —$CF_2H$, and —$CF_2Cl$.

7. A method to refine a lubricant comprising a compound having a perfluoropolyether structure, the method comprising:

introducing a raw material of the lubricant into a pressurized vessel having an inlet part and an outlet part;

contacting the raw material of the lubricant with a supercritical carbon dioxide under a first condition in the pressurized vessel to extract and remove a perfluoropolyether compound having a terminal group of weak polarity, wherein the supercritical carbon dioxide is introduced from the inlet part and flows through the pressurized vessel at a predetermined rate;

contacting the remaining lubricant, from which the perfluoropolyether compound having a terminal group of weak polarity is removed, with the supercritical carbon dioxide under a second condition in the pressurized vessel to remove ionic impurities from the lubricant, wherein the supercritical carbon dioxide is introduced from the inlet part and flows through the pressurized vessel at a predetermined rate; and recovering the lubricant, from which both the perfluoropolyether compound having a terminal group of weak polarity and ionic impurities are removed, from the pressurized vessel.

8. The method to refine a lubricant according to claim 7, wherein the first condition is a combination of a temperature and a pressure at which a density of the supercritical carbon dioxide is less than or equal to a first density of the supercritical carbon dioxide at a temperature of 60° C. and a pressure of 16 MPa; and the second condition is a combination of a temperature and a pressure at which a density of the supercritical carbon dioxide is less than or equal to a second density at a temperature of 60° C. and a pressure of 20 MPa.

9. The method to refine a lubricant according to claim 7, wherein the perfluoropolyether compound having a terminal group of weak polarity has a terminal group included in the group consisting of —$CF_3$, —$CF_2H$, and —$CF_2Cl$, and the ionic impurities are included in the group consisting of sodium ions, potassium ions, chloride ions, $HCO_3$ ions, $HSO_4$ ions, and sulfate ions.

* * * * *